United States Patent [19]

Nail

[11] 4,311,919
[45] Jan. 19, 1982

[54] TRANSFER LOGIC CONTROL CIRCUITRY

[75] Inventor: George R. Nail, Albuquerque, N. Mex.

[73] Assignee: Public Service Company of New Mexico, Albuquerque, N. Mex.

[21] Appl. No.: 185,284

[22] Filed: Sep. 8, 1980

[51] Int. Cl.³ .......................... H02J 3/06; H02J 9/06
[52] U.S. Cl. ......................................... 307/64; 307/87
[58] Field of Search ...................... 307/23, 64, 87, 68, 307/129

[56] References Cited

U.S. PATENT DOCUMENTS 3,491,248  1/1970  Beckwith et al. ............... 307/87
4,256,972  3/1981  Wyatt et al. .................... 307/68

Primary Examiner—Michael L. Gellner
Attorney, Agent, or Firm—Leo J. Aubel; Robert E. Wagner

[57] ABSTRACT

The inventive transfer logic controller provides a method and system for effecting three types of power transfer to a plant bus comprising a fast transfer, synchronous transfer and decay or residual voltage transfer.

12 Claims, 5 Drawing Figures

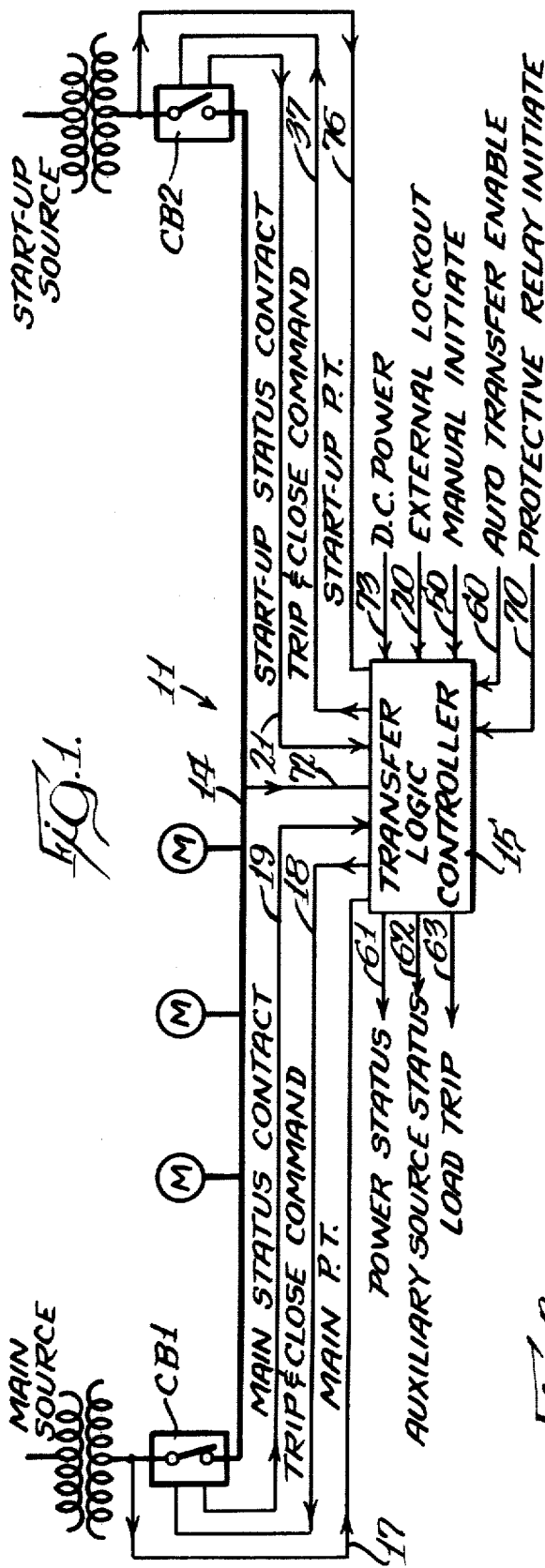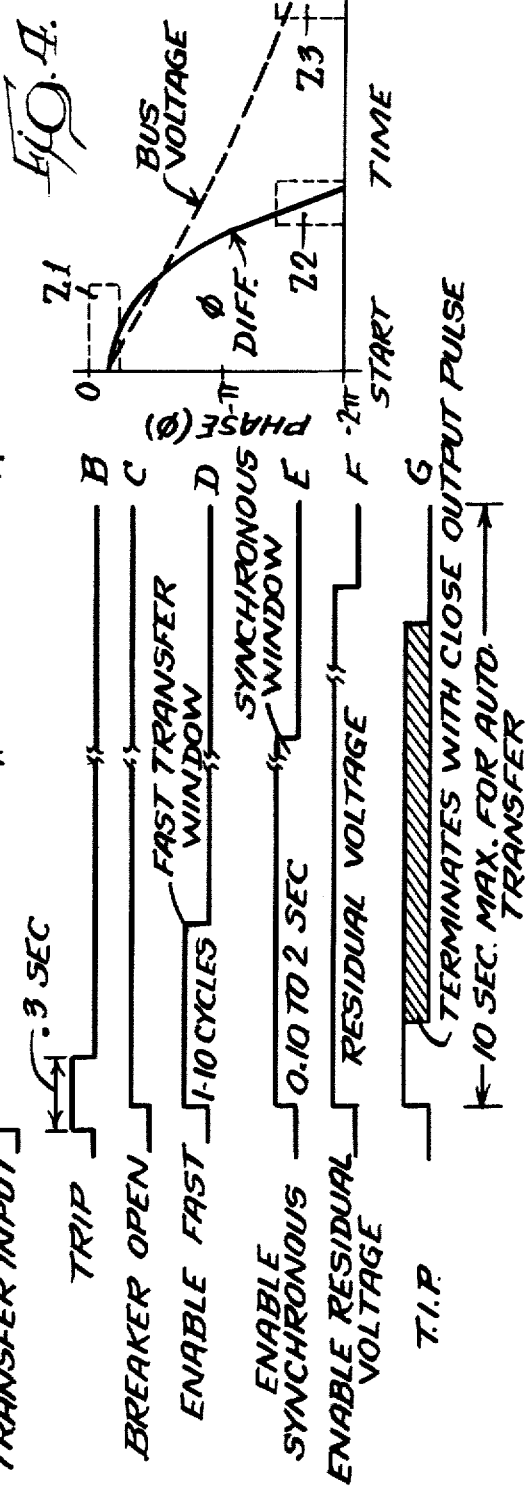

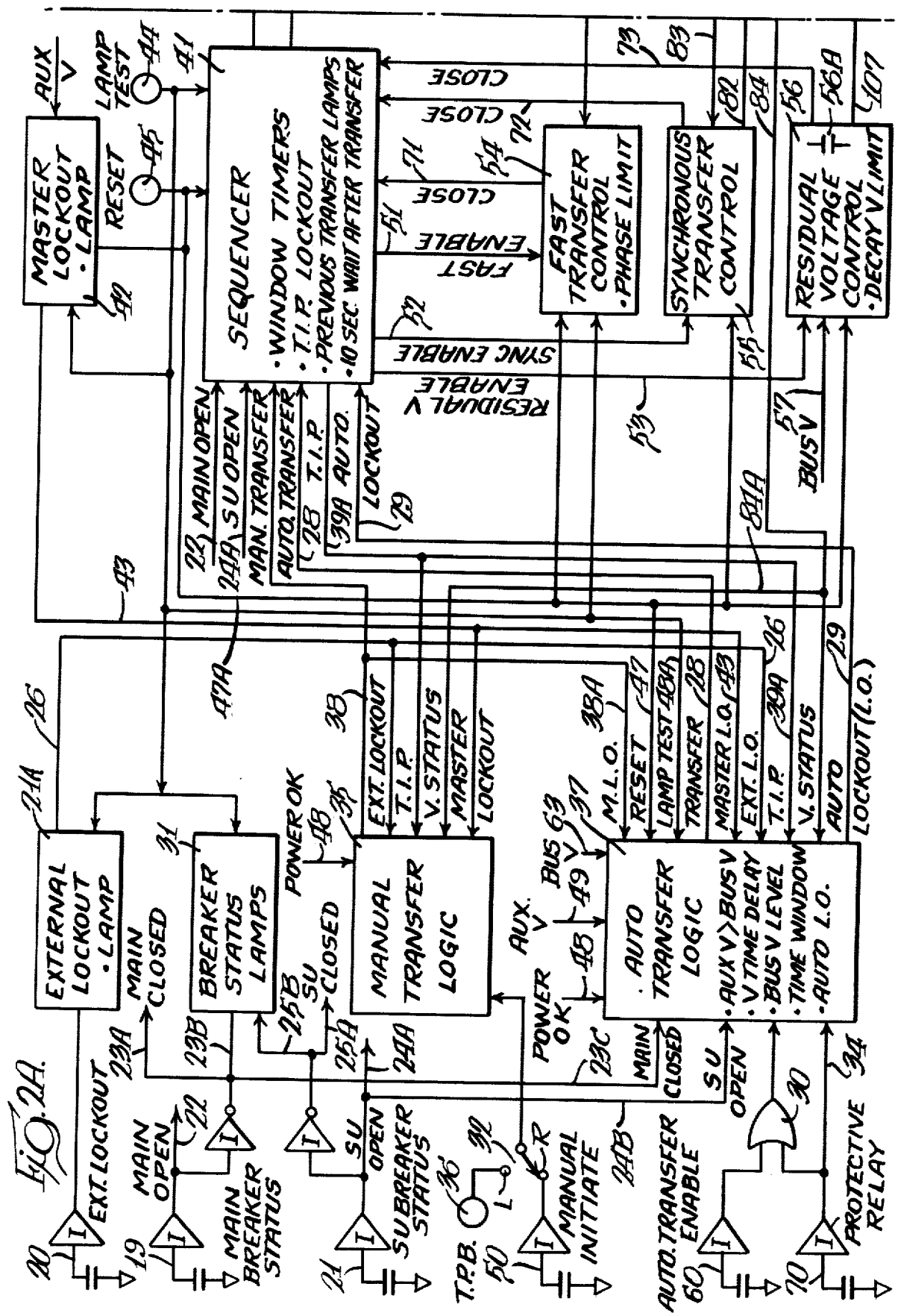

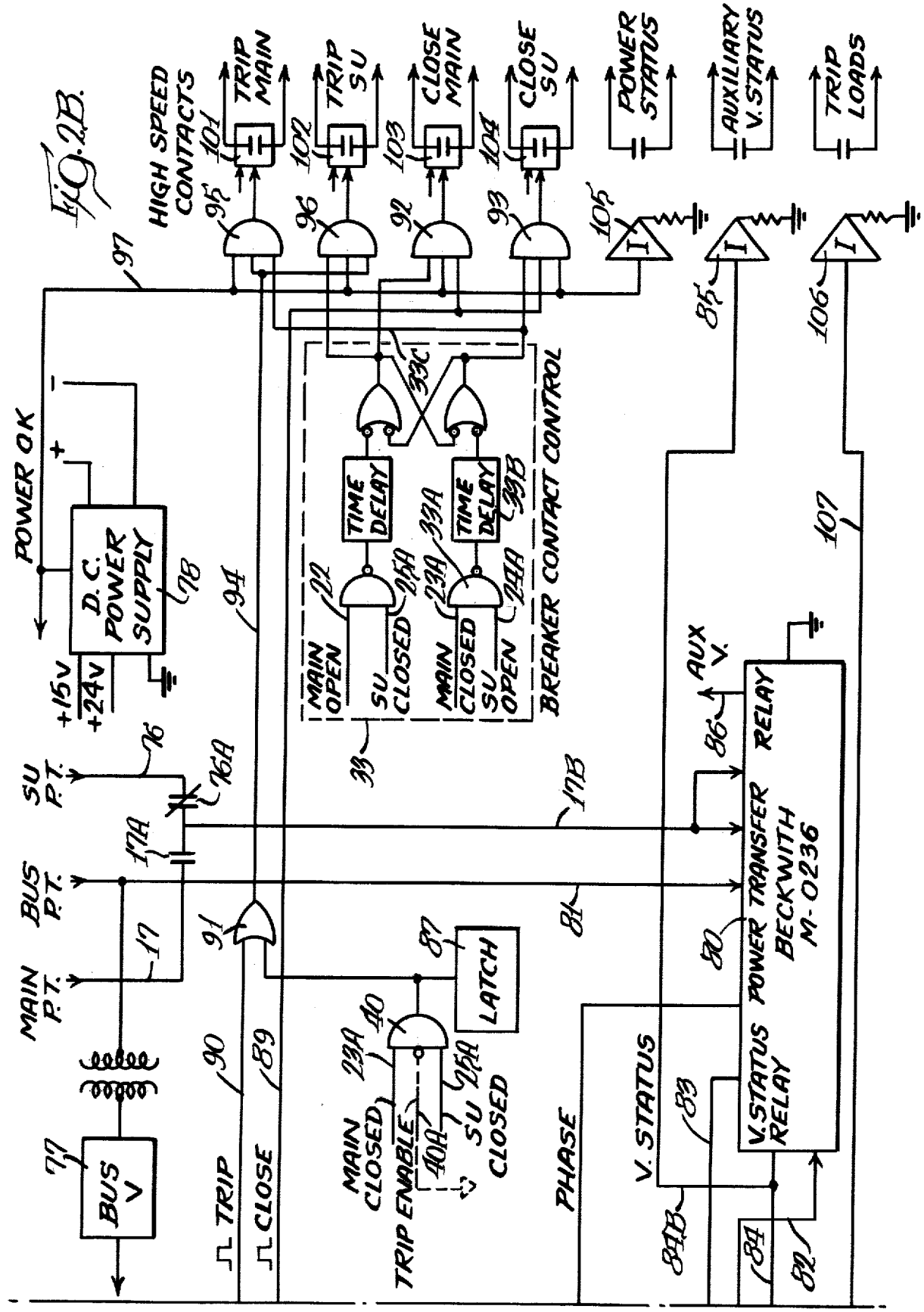

TRANSFER LOGIC CONTROL CIRCUITRY

DESCRIPTION

1. Technical Field

An inventive transfer logic controller providing a method and system for effecting three types of transfer of power from a second A.C. source to a power plant bus to which power from a first source has been interrupted, said transfers comprising a fast transfer, synchronous transfer, and decay or residual voltage transfer.

2. Background Prior Art

In a typical bus system, motors are connected to a bus system which in turn is connected to a main power system. A secondary or back-up system is provided for powering the motor bus should the main power be interrupted. In the case of a fault occuring in the main system, the prior art teaches the concept of interrupting the power input from the main system to the motor bus, and transferring power from the secondary source to the motor bus in a synchronous mode; that is, power is transferred from the secondary source to the motor bus when the phase difference of the secondary source with respect to the frequency of the motor bus residual voltage is essentially zero degrees. Also known is the method of allowing the residual voltage to decay to a low level, and then effecting the transfer.

Apparatus and methods are known in the prior art such, as for example, U.S. Pat. No. 4,031,407 to Reed; U.S. Pat. No. 3,794,846 to Schlicher; U.S. Pat. No. 3,599,007 to Martin and U.S. Pat. No. 3,491,248 to Beckwith which provide circuitry for obtaining proper phase and frequency connection of a power source to an operating bus system. Reference is also made to U.S. Pat. No. 4,256,972 entitled Power Transfer Relay Circuitry and Method of Phase Measurement filed in the names of Michael Wyatt and Robert M. Beckwith.

SUMMARY OF THE INVENTION

A method and apparatus system are disclosed for providing a selected type of operation for transferring or coupling a second source of power to a motor bus which bus has been receiving power from a main source and said source of main power has been interrupted. The method and system of the invention include a transfer logic control circuit for selectively providing a fast transfer, a synchronous transfer, or residual voltage transfer of power from the secondary source to the motor bus.

DESCRIPTION OF DRAWINGS

FIG. 1 is a block diagram of a bus system of the type in which the present invention is generally applicable.

FIGS. 2A and 2B show a block diagram of the transfer logic controller of the invention;

FIGS. 3 and 4 are graphs showing the timing diagram of the operation of the inventive controller.

DETAILED DESCRIPTION OF THE INVENTION

Refer now to FIG. 1 of the drawings, which shows a simplified, power plant system 11. Under normal conditions, the main source provides power through the main transformer 12 and a first circuit breaker CB1 to the motor bus 14 to which motors M are connected. A fault in the system 11, such as a fault in the main transformer 12 resulting in the emergency shutdown of the main source generator will cause circuit breaker CB1 to open and interrupt power to the motor bus 14. As is known, it is desirable to restore power to the motor bus 14 as quickly and smoothly as possible to continue operation of the motors; and the transfer must be done without damaging the rotating equipment. This may be accomplished by closing a second breaker CB2 connected to a secondary or back-up power source; provided however, that means are available to control the phase, frequency, and amplitude of the voltage between the secondary power source and the varying frequency of the induced decaying residual voltage of the motors M or other equipment connected to the motor bus 14.

As will be described, the inventive transfer control system 11 provides a method and apparatus for controlling the transfer of power from a source dependent on the relation of the phase, frequency and voltage of that source with the phase frequency and amplitude of the residual voltage on the motor bus. More particularly, the inventive transfer logic controller 15 includes logic and control circuitry required to selectively effect a fast transfer, a synchronous transfer, or a residual voltage transfer, as will be described.

It is clear from FIG. 1 that the transfer logic controller (TLC) 15 is the control center of the system 11 of FIG. 1. The TLC 15 will be explained with reference to FIGS. 2A, 2B, and 3 as well as to FIG. 1.

In normal operation, circuit breaker CB1 of any suitable known type, (depicted herein for present purposes as a simple mechanical on-off switch), connecting through the potential transformer 12 to the main source, is closed; and, circuit breaker CB2 (similar to CB1) connecting through a potential transfer 16 to a secondary or start up source (SU), is open. The motors M connected to motor bus 14 will thus be powered by the main source generators. Assuming a fault occurs in the main source system, such as in transformer 12, this status is communicated by suitable signals through lead 17 to the TLC 15.

The TLC 15 contains the logic and control circuitry required to selectively provide three types of power plant bus transfers. The transfer methods used in system 11 are fast transfer, synchronous transfer, and residual voltage transfer. The same sequence is followed in each transfer operation.

The transfer sequence is initiated by coupling a trip command through lead 18 to the closed breaker CB1. When the breaker status signal on leads 19 and 21 respectively indicate that breakers CB1 and CB2 are both open, the fast transfer, synchronous transfer, and residual voltage transfer circuits are selectively enabled in accordance with the invention, as will be described.

Refer now also to FIGS. 2A and 2B. In FIGS. 2A and 2B the inputs and outputs to the TLC 15 correspond to the similarly labeled inputs and outputs in FIG. 1. Referring initially to the upper left corner of FIG. 2A, the various inputs to the TLC 15 are coupled through suitable interface circuits generally labeled as I, as is known in the art. It should be noted at the outset that the individual circuits of the block diagram of FIGS. 2A and 2B to be explained hereinbelow comprise known logic circuits to effect the operation required. The invention thus consists of a system comprising a unique combination of individual circuits, and a unique method of operating the system to provide various advantageous results.

The external lockout 21 is set by external lockout 20 input contact closing, the external lockout 21 is reset by the external lockout 20 input contact opening. External lockout 21 couples a signal through lead 26 to the manual transfer logic 35 and the automatic transfer logic 37 to disable these sub-circuits when the external lockout is set. An indicator lamp is provided to show the state of the external lockout 21.

The main breaker status 19 input indicates the status of the circuit breaker CB1 (FIG. 1). If the main circuit breaker CB1 is open, a signal is coupled through lead 22 to the sequencer 41 and to the main circuit breaker contact controls 33, see FIG. 2B. (For purposes of simplifying the drawing, lead 22, and leads generally labeled 23, 24 and 25, to be described, have not been fully extended on FIG. 2A and 2B, but are clearly indicated by the similarly numbered numerals to show the connection to the respective components).

If the main circuit breaker CB1 is closed, a signal is provided through an inverter and lead 23A to the breaker contact controls 33 and And gate 40, and also through lead 23B to the breaker status lamps 31 indicator. The main closed signal is also coupled through lead 23C as to the auto transfer logic 37 to be described. Similarly, the start-up (SU) breaker status input 21 SU open signal is coupled through lead 24A to the sequencer 41 and to breaker contact control 33 (FIG. 2B); the SU open signal is also coupled to auto transfer logic 37 through lead 24B. The SU closed signal is coupled through an inverter and lead 25A to the breaker contact control 33 and to And gate 40, and also through lead 25B to the breaker status lamps 31.

The manual initiate input 50 is coupled through a local remote switch 32 to a manual transfer logic 35. Depending on the setting of the local and remote switch 32, a manual transfer can be actuated by a push-button 36 if the switch is on local L setting; or, if the switch 32 is on remote R setting, the manual transfer logic 35 may be energized by the input singal on terminal 50.

The automatic transfer enable input 60 provides an input through a Or circuit 30 to the automatic transfer logic 37. Another input to the auto transfer logic 37 is provided from a protective relay initiate terminal 70 through lead 34. Protection relay initiate terminal 70 also provides an input to Or circuit 30.

Manual Transfer Logic

The manual transfer logic 35 receives a manual transfer signal from manual initiate 50 through switch 32 which permits a manual transfer to be initiated locally or remotely, as stated above. The system 11 is programmed such that manual transfer can be initiated only if all the following conditions exist. The external lockout 21 must be reset (this status signal is coupled through lead 26 to manual transfer logic 35); transfer in process (T.I.P.) signal on lead 39A must indicate that a previous transfer is not in process; the voltage status signal on lead 84A from relay 80 must indicate that the auxiliary source voltage is within preset limits; the master lockout signal on lead 43 must indicate that master lockout 42 circuit is reset; the internal power must be stable as indicated on lead 48; one of circuit breakers CB1 or CB2 must be open and the other circuit breaker closed.

If all the foregoing conditions are correct, upon the receipt of a manual transfer command, the manual transfer logic 35 sends a transfer command through lead 38 to the sequencer 41. Manual transfer logic 35 always transfers from the initially closed breaker to the breaker that was initially opened.

Auto Transfer Logic

The auto transfer logic 37 determines when to initiate an automatic transfer. The auto transfer logic 37 can only transfer from the main source to the start up source.

The auto transfer logic 37 includes a number of inputs as indicated. The auto transfer enable 60 input and protect relay input 70 control the initiation of the automatic transfer. The auto transfer logic 37 receives a main closed input on lead 23C and an SU open input on lead 24B. As mentioned above, this is the only condition under which auto transfer logic 37 will operate. Auto transfer logic 37 also receives a power OK input on lead 48, an auxiliary voltage level input on lead 49 and a bus voltage input on lead 63.

Other inputs to auto transfer logic 37 include a signal on lead 38A which indicates a manual transfer logic in operation signal; a reset signal coupled through leads 47 and 47A from reset push button 45; a lamp test input on lead 48A from lamp test button 44; a master lockout signal on lead 43 from master lock unit 42; the external lockout signal on lead 26, previously mentioned; a transfer in process (T.I.P.) signal on lead 39A from the sequencer 41, as will be explained; and a voltage status signal on lead 64A from a power transfer relay 80. The auto transfer logic 37 includes various lamps (not shown) to visually show the bus voltage level status, the voltage time delay status, the time windows (to be explained), and the automatic lockout signals.

An output of the automatic transfer logic 37 is a signal through a lead 28 to initiate or enable an automatic transfer sequence by sequencer 41. A second output from auto transfer logic 37 on lead 29 is coupled to sequencer 41 to provide an automatic lockout input to the sequencer 41.

With the auto transfer enable input 60 contact closed, the auto transfer logic 37 compares the bus voltage on lead 63 to a selected limit. If the bus voltage falls below the limit, for an adjustable time period, and if the SU voltage is of a higher amplitude than the bus voltage an automatic transfer is initiated.

When the protective relay 70 input contact closes, the auto transfer logic compares the bus voltage to the auxiliary voltage. If the bus voltage is less than the auxiliary voltage, the transfer sequence is started as will be explained.

Master Lockout

The master lockout 42 receives an input indicative of the auxiliary voltage; and if the auxiliary voltage is below a preset level, unit 42 is set, that is it provides an input through lead 43 to the manual transfer logic 35 and the automatic transfer 37 to disable these circuits if such condition exists. The master lockout 42 is reset by the auxiliary voltage increasing above the preset level. A lamp is provided to indicate the status of the master lockout.

A lamp test push button 44 is included which provides a voltage to test the lamps of the various units.

Sequencer and Transfer Controls

The sequencer 41 comprises timing circuitry, as will be explained with reference to FIG. 3. The sequencer 41 receives an input on lead 22 indicating that the main breaker contacts are open; an input on lead 24A that the start-up breaker contacts are open; an input on lead 38 that a manual transfer is in process; an input on lead 28 which is a command from auto transfer logic 37 to initiate an automatic transfer; and an input on lead 29 which is an automatic lockout signal. Sequencer 41 also receives a reset command from reset button 45 and a lamp test query from lamp test button 44. The sequencer 41 provides an output on lead 39A indicating that a transfer is in process. Additionally, sequencer 41 provides the fast enable, synchronous enable and residual enable timing windows thorugh respective leads 51, 52 and 53 to the fast transfer control 54 synchronous transfer control 55 and residual voltage control 56. The fast transfer control 54, synchronous transfer control 55 and the residual voltage control 56 each provide a close signal through respective leads 71, 72 and 73 to the sequencer 41.

Referring now also to FIG. 2B, sequencer 41 provides a trip command through lead 90, Nor circuit 91, and lead 94 to And gates 95 and 96, for purposes to be described. A latch 87 and And gate 40 provide a second input to Nor gate 91. Sequencer 41 provides a close command through lead 89 to And gates 92 and 93.

The bus voltage block 77 provides an output indicative of the bus voltage amplitude. The voltage from the main potential transformer appearing on lead 17, and the voltage from start-up potential transformer appearing on lead 76 are alternatively coupled through switch contacts 17A and 76A respectively, and thence through lead 17B to the power transformer relay 80. Power transformer relay 80 also receives an input from the bus potential transformer through lead 81.

Transfer Control Relay

As mentioned above, the transfer relay 80 is the subject of patent application Ser. No. 37,680, and the description of said application is specifically incorporated herein by reference. Relay 80 receives a transfer signal on lead 82 from synchronous transfer control 55, as will be explained, to effect the synchronous transfer operation. Relay 80 provides an output on lead 83 to initiate the synchronous transfer. Relay also provides a voltage status signal through lead 84 to the automatic transfer logic 37 and through lead 84A to the output interface 85. Relay 80 also provides an auxiliary voltage output on lead 86.

A DC power supply 78 provides +15 V and +24 V for operation of the system.

Breaker Contact Control

The breaker contact control 33 comprises a logic circuit providing an output dependent on the particular combination of the input levels of the main open input, SU closed input, main closed input, and an SU open input, as is well-known in the art; that is, breaker contact control 33 provides steering logic for the input signals. The output of the breaker contact control 33 is coupled as one input to each of three-input And gates 92, 93, 95 and 96. A third input to each of And gates 92, 93, 95 and 96 is a power OK input on lead 97.

The breaker contact 33 control provides a nominal 1.5 second time delay to thereby delay changing the steering logic. The particular operational logic for breaker contact 33 is given in the following table.

| BREAKER STATUS | | HIGH SPEED SWITCH STATE | | | |
|---|---|---|---|---|---|
| Main | SU | Trip Main | Trip SU | Close Main | Close SU |
| Open | Closed | Disabled | Enabled | Enabled | Disabled |
| Closed | Open | Enabled | Disabled | Disabled | Enabled |
| Open | Open | No Change from Previous State | | | |
| Closed | Closed | Trips Breaker that was Previously Closed (if enabled) | | | |

And Gates and High Speed Contact

The output of And gate 95 is coupled to the control circuitry 101 for a high speed breaker coil contact to provide a trip command for the main circuit breaker. The output of And gate 96 is coupled to control circuitry 102 to provide a trip command for the SU breaker. The output of And gate 92 is coupled to control circuitry 103 to provide a close command to the main breaker. The output of And gate 93 is coupled to the control circuitry 104 to provide a close command to the SU breaker.

An output interface circuit 105 provides a power status indication, and an output interface circuit 106 receives a signal on lead 107 to indicate a residual voltage on bus 14 which is sufficient low to trip the load, as will be explained.

Operation

A typical transfer operation of the inventive transfer method and system will now be described. Assume as before that a fault has occurred in the main source system. The main breaker status 19 signals and the SU breaker status signals 21 are coupled to auto transfer logic 37, sequencer 41 and breaker contact controls 33.

The auto transfer logic 37 TLC 15 initiates transfer automatically based upon preset conditions. As mentioned above, auto transfer can initiate commands to sequencer 41 to transfer from the main source to SU source. When the breaker status signals to sequencer 41, on leads 22 and 24A, indicate that both breakers CB1 and CB2 are open, sequencer 41 enables the fast transfer 54, synchronous transfer 55 and the residual voltage transfer 56 control circuits.

With the auto enable external 60 contact closed, the auto transfer logic 37 compares the bus voltage to the lower limit set on the bus voltage level control. When the protective relay initiate external contact closes, the auto transfer logic compares the bus voltage to the auxiliary voltage on lead 63. If the bus voltage is less than the auxiliary voltage, for selected time period, the transfer sequence is started.

The auto transfer enable 60 contact can be continuously closed and the auto transfer logic 37 will respond to the voltage conditions as described above. When only the auto transfer enable 60 contact is closed, the timing window begins when the auto transfer is initiated.

When the protective relay initiate 70 contact is closed, the timing window begins immediately. The protective relay initiate contact should be closed only if there is reason to believe the voltage conditions for the auto transfer logic 37 will be satisfied within the timing window. As shown in FIG. 3, the timing window is adjustable from 1 to 10 seconds for a transfer to be completed. If the timing window is exceeded, the auto transfer lockout 29 is set and stop any auto transfer in process and will prevent any further auto transfers until reset. The auto lockout can be reset by a manual transfer or by the reset push button. An auto lockout lamp, as shown, will be on when the auto lockout is set.

Refer now to the timing diagram of FIG. 3 which shows the timing sequence followed during the transfer operation. In FIG. 3, line A indicates a transfer input command to sequencer 41. Line B of FIG. 3 indicates a trip command from sequencer 41 extending for about 0.3 seconds. The signal from sequencer 41 is coupled through lead 97, Nor gate 91 and lead 94 to And gates 95 and 96. The breaker status, at this instant, is that Nand gate 33A is enabled to couple a signal through lead 33C to in turn enable And gate 95 to trip the main breaker. Approximately 0.15 seconds after initiation of the trip signal the main breaker opens, and substantially instantaneously the fast transfer 54, synchronous enable 55 and residual enable control circuit 56 are enabled. A transfer in process (T.I.P.) signal also initiated at the same time, as will be explained.

As stated above, the sequencer 41 provides the timing and control functions to sequence through the three transfer techniques. The fast transfer window timer is fixedly set to extend for a period of 0.17 seconds, (line D, FIG. 3), the synchronous transfer window timer is adjustable set from 0.1 sec. to 2 sec. (line E, FIG. 3). The residual voltage transfer is enabled by the sequencer 41, and the length of this time window will be explained hereinbelow (See line F, FIG. 3). The transfer in process timing window (T.I.P.) is initiated by the sequencer 41 and terminates with the close output pulse; however, a 10 second maximum window is provided for auto transfer (line G, FIG. 3).

When the fast transfer control 54 receives the fast enable signal on lead 51 from sequencer 41, its logic will compare the phase information received from transfer relay 80 with the limit set on the phase angle control. If the phase of the start-up source voltage and the bus voltage are within a preset difference in phase angle, the fast transfer control 54 will issue a close command through lead 71 to sequencer 41. Sequencer 41 will couple the close signal through lead 89 to And gates 92 and 93, as will be described. The phase angle control is adjustable from 0° to 45°.

A sync enable signal is coupled from sequencer 41 through lead 52 to cause sync transfer control 55 to issue an active input signal through lead 82 to transfer relay 80 during the sync transfer time window. The relay 80 cause a synchronous transfer signal to be provided through lead 83 to transfer control 55 in accordance with the structure and method described in the aforesaid patent application Ser. No. 37,680. The sync transfer control 55 then issues a close pulse through lead 72 to sequencer 41 which in turn provides a close command through lead 89 to And gates 92 and 93.

As stated above the residual voltage control 56 is enabled by sequencer 41 through lead 53. The residual voltage control 56 compares the bus voltage received on lead 57 with a preset lower limit and issues a close command when the bus voltage drops below the limit. The residual voltage control 56 includes a normally open relay contact output (indicated schematically as 56A) that closes approximately 50 milliseconds before the high speed contacts cause the breaker contact to close on a residual voltage closure.

Once a transfer sequence has started, the sequence will be completed unless the auto time window is exceeded or unless the power OK signal indicates the DC power to the TLC is out of spec. After the close command is sent, completing the transfer sequence, the TLC wil go into an inoperative state for 10 seconds.

The previous transfer lamps in sequencer 41 are updated each time a successful transfer is made. These lamps will indicate the type of transfer made during the last transfer sequence. The information in these lamps will be valid as long as the power to the TLC remains on. The transfer lamps will all be reset when power is applied and will remain reset until the first transfer is complete.

As mentioned above, in the example being described, the main circuit breaker CB1 is initially closed and the SU circuit breaker CB2 is initially open. This status signals are coupled through leads 23A and 24 to Nand gate 33A. This status condition signal is steered to the inputs of And gate 93 for the close SU high speed contacts and to And gate 95 for the trip main high speed contacts. When sequencer 41 couples the trip pulse through lead 94 to And gates 95 and 96; And gate 95 will be enabled to provide a signal to high speed contact control 101 to trip the main circuit breaker CB1. In this state, both circuit breaker CB1 and CB2 will be open. Breaker contact control 33 includes a time delay 33B which provides a selected delay in changing the state of the steering logic. When both breakers CB1 and CB2 are open, the control circuitry remembers which breaker was previously open and this is the breaker that will be closed by the close pulse coupled through lead 89 from sequencer 41.

An auto trip function is provided by gate 40 and latch 87. This auto trip circuitry trips the breaker that was previously closed. The auto trip function is enabled by the internal connection indicated by lead 40A and can be disabled by removing the connection.

Thus it can be appreciated that the power transfer control system of the invention including the transfer logic controller contains the logic and control circuitry required to provide control of the three important power plant bus transfer methods, namely a fast transfer, synchronous transfer and residual voltage transfer.

While the invention has been particularly shown and described with reference to a preferred embodiment thereof, it will be understood by those skilled in the art, that various changes in form and details may be made therein without departing from the spirit and scope of the invention.

I claim:

1. A power transfer logic controller (TLC) including a first source of power for energizing a motor bus and a second source of power selectively connectable to energize said motor bus such as in the event of a fault in said first source, said TLC comprising in combination, means for initiating a fast transfer operation including means for comparing the phase of the second source of power with the phase of the residual voltage on said motor bus, means for initiating a fast transfer if said phases are within a selected range of one another, means for initiating a synchronous transfer, transfer relay means for determining indication that the frequency of said second source is in substantial synchronism with the frequency of said residual bus voltage and initiating a transfer, means for effecting a residual voltage transfer, said residual voltage transfer control comparing the residual voltage on said motor bus to a preset reference and initiating a transfer when said motor bus residual voltage is below said reference, a sequencer means for providing timing windows for said fast transfer control and said synchronous transfer control to effect transfer within the time periods set by said synchronizer, means coupling the output of said residual voltage control to the sequencer to provide an end of period signal to said sequencer to indicate the termination of a preset time period, and means actuable by said fast transfer control circuit, said synchronous control circuit and said residual voltage control circuit to said sequencer means to effect a closure of the circuit breaker to said second source.

2. Apparatus as in claim 1 further including circuit breaker control means comprising steering logic for receiving an indication of the open and closed status of the first source circuit breaker and of the second source circuit breaker, logic gates for concurrently receiving the output of said circuit breaker control means and the output of said sequencer to provide a selected operation of said circuit breakers.

3. Apparatus as in claim 2 further including high speed contacts controlled by said logic gates, said logic gates being enabled for energizing said circuit breakers to selectively close said second source circuit breaker when said first source circuit breaker is opened.

4. An apparatus as in claim 1 further including an enabling means selectively connectable to energize said high speed contacts when both said circuit breakers are opened.

5. An apparatus as in claim 1 further including a manual transfer control means for manually energizing said sequencer to initiate a transfer in response thereto, said manual control means enabling the initiation of control signals opening said second source circuit breakers and closing said first source circuit breakers to restore the initial operating condition of the power system.

6. An apparatus as in claim 1 further including an automatic transfer control circuit for providing a signal to said sequencer to initiate a transfer operation, input means to said automatic transfer control controlling the operations of said automatic transfer control wherein said automatic transfer control is enabled only after the inputs to said transfer control conform to pre-established references.

7. A method of transferring the power received by a motor bus from a first A.C. source of power energizing the motor bus to a second A.C. source of power energizing the motor bus consisting of the steps of:

a. providing an indication of the status of the circuit breaker connecting to the first source of power;
b. providing an indication of the status of the circuit breaker connecting to the second source of power;
c. initiating timing windows to transfer power from the first source to the second source in a selected sequence;
d. initiating a fast transfer control;
e. comparing the phase of the second source with the phase of the residual voltage on said motor bus;
f. transferring power when the phase between the second source and said motor bus voltage is with present range;
g. initiating a synchronous control transfer timing window concurrently with that fast transfer timing window;
h. providing a synchronous transfer of power if said fast transfer is not effective;
i. initiating a residual voltage timing window concurrently with the fast transfer and synchronous transfer timing windows;
j. determining the level of said motor bus voltage;
k. initiating a transfer of the motor bus residual voltage;
l. providing a timing window extending for a preset time prior to which any transfer must be accomplished, and disabling said transfer controls if said transfer has not been effective within said preset time.

8. A method as in claim 7 wherein said fast transfer timing window extends for a first time period, said synchronous transfer timing window extends for a second and longer time period, and said residual voltage timing window extends for a third and still longer time period.

9. A method as in claim 7 further including the step of enabling only one of said fast transfer control, synchronous control and residual voltage control at a given time.

10. A method as in claim 7 further including the step of providing a manual control for effecting transfer of power between said sources.

11. A method as in claim 7 further including the step of providing steering logic for effecting selected power transfer dependent on input conditions.

12. A method as in claim 7 further including the step of delaying transfer dependent on a previous attempted transfer.

* * * * *